United States Patent
Chen et al.

(10) Patent No.: US 8,179,408 B2
(45) Date of Patent: May 15, 2012

(54) PROJECTIVE CAPACITIVE TOUCH APPARATUS, AND METHOD FOR IDENTIFYING DISTINCTIVE POSITIONS

(75) Inventors: Hsiang-Yi Chen, Hsinchu (TW); Yao-Jen Hsieh, Hsinchu (TW); Heng-Sheng Chou, Hsinchu (TW); Ming-Jong Jou, Hsinchu (TW); Pang-Chiang Chia, Hsinchu (TW); Shih-Yi Liao, Hsinchu (TW)

(73) Assignee: Au Optronics Corp., Hsinchu (TW)

( * ) Notice: Subject to any disclaimer, the term of this patent is extended or adjusted under 35 U.S.C. 154(b) by 763 days.

(21) Appl. No.: 12/347,160

(22) Filed: Dec. 31, 2008

(65) Prior Publication Data

US 2010/0039405 A1 Feb. 18, 2010

(30) Foreign Application Priority Data

Aug. 13, 2008 (TW) ................................ 97130852 A

(51) Int. Cl.
G06F 3/045 (2006.01)

(52) U.S. Cl. ........................................................ 347/174

(58) Field of Classification Search .................... None
See application file for complete search history.

(56) References Cited

U.S. PATENT DOCUMENTS

| | | | |
|---|---|---|---|
| 5,943,043 A | 8/1999 | Furuhata et al. | |
| 7,411,575 B2* | 8/2008 | Hill et al. | 345/156 |
| 7,808,490 B2* | 10/2010 | Chang et al. | 345/173 |
| 7,830,158 B2* | 11/2010 | Geaghan | 324/678 |
| 2004/0001048 A1* | 1/2004 | Kraus et al. | 345/173 |
| 2004/0130537 A1 | 7/2004 | Kong et al. | |
| 2006/0152500 A1* | 7/2006 | Weng | 345/173 |
| 2008/0048990 A1* | 2/2008 | Cho et al. | 345/173 |
| 2008/0150906 A1* | 6/2008 | Grivna | 345/173 |
| 2008/0165132 A1* | 7/2008 | Weiss et al. | 345/173 |
| 2008/0180406 A1* | 7/2008 | Han et al. | 345/173 |
| 2008/0297482 A1* | 12/2008 | Weiss | 345/173 |
| 2009/0058818 A1* | 3/2009 | Chang et al. | 345/173 |
| 2009/0303196 A1* | 12/2009 | Furukawa | 345/173 |
| 2010/0007631 A1* | 1/2010 | Chang | 345/174 |
| 2010/0019780 A1* | 1/2010 | Bulea | 324/662 |
| 2010/0026527 A1* | 2/2010 | Nishimura et al. | 341/5 |
| 2010/0039405 A1* | 2/2010 | Chen et al. | 345/174 |
| 2010/0066701 A1* | 3/2010 | Ningrat | 345/174 |
| 2011/0074735 A1* | 3/2011 | Wassvik et al. | 345/175 |

* cited by examiner

Primary Examiner — Peter Vincent Agustin
(74) Attorney, Agent, or Firm — Thomas, Kayden, Horstemeyer & Risley, LLP

(57) ABSTRACT

A projective capacitive touch apparatus and a method for identifying multi-touched positions are provided. The multi-touched positions are touched on a projective capacitive touch panel. The method comprises the following steps: generating a first set of reference values according to the first touch position; generating a plurality of second sets of reference values according to a second touch position, and filtering out at least one ghost second set of reference values from the second sets of reference values. Furthermore, the plurality of second sets of reference values comprise a real second set of reference value and at least one ghost second set of reference values, while the ghost second set of reference values comprises parts of the first set of reference values.

28 Claims, 4 Drawing Sheets

PROJECTIVE CAPACITIVE TOUCH APPARATUS, AND METHOD FOR IDENTIFYING DISTINCTIVE POSITIONS

This application claims priority to Taiwan Patent Application No. 097130852 filed on Aug. 13, 2008, the disclosures of which are incorporated by reference herein in their entirety.

CROSS-REFERENCES TO RELATED APPLICATIONS

Not applicable.

BACKGROUND OF THE INVENTION

1. Field of the Invention

The present invention relates to a projective capacitive touch apparatus and a method for identifying touched positions. More particularly, the present invention relates a projective capacitive touch apparatus for identifying distinctive touched positions and a method for identifying distinctive touched positions.

2. Descriptions of the Related Art

In the past, interaction with computers or machines was mainly through keyboards and mice as interfaces. With the advancement of science and technology, product designs are evolving towards more user-friendly human-machine interfaces (HMIs), among which touch panels have become very popular input devices and have found a wide application in personal computers, notebook computers, personal digital assistants (PDAs), mobile phones, automatic teller machines (ATMs), various ticket machines and the like. This kind of intuitive input devices allows the user to activate desired functions directly on a screen without need of keyboards, mice or other additional input devices. This helps to reduce the volume and weight of the final product and presents a more pleasing appearance.

The popular touch schemes currently available fall into the following five categories: the resistive touch scheme, the capacitive touch scheme, the surface acoustic wave touch scheme, the optical touch scheme and the electromagnetic touch scheme, each of which has respective advantages and disadvantages and is applicable to different fields.

As the touch technology advances, the concept of multi-touch has been proposed and developed. As compared to the conventional single-touch input mode, the multi-touch input mode allows the user to perform more complex and diversified functional operations. Among the various touch schemes, the resistive and the surface acoustic wave touch schemes fail to accomplish the multi-touch function as restricted by the induction principle thereof. The electromagnetic induction touch scheme necessitates the use of a dedicated electromagnetic pen, which is unfavorable for the multi-touch application. The optical touch scheme, although allowing detection of distinctive positions in the multi-touch mode, requires an installation of a corresponding reflecting light receiver, which makes the touch system relatively bulky and inapplicable to low-profile or miniaturized screens.

Consequently, the capacitive induction touch scheme becomes the preferred option that allows for the multi-touch function. As compared to other touch schemes, the capacitive induction touch panel only needs to be touched slightly by a finger without pressing. Furthermore, the capacitive induction touch screens feature high resolution, high light transmittance and multi-touch function, and are suitable for use in low-profile and miniaturized screens.

According to the capacitive induction touch scheme, the coordinates of the touched position is detected by sensing a current generated at the touched position in response to the capacitance variation arising from the static induction between the transparent electrode and finger. The capacitive induction touch scheme is divided into two categories according to the different induction principles: the surface capacitive touch scheme and the projective capacitive touch scheme. However, the surface capacitive touch scheme is only able to detect a single-touch, so only the projective capacitive touch scheme allows for multi-touch detection.

FIG. 1 is a schematic view illustrating the structure of a conventional projective capacitive touch apparatus 1. The projective capacitive touch apparatus 1 comprises a protective layer 11, a display device 12, a projective capacitive touch panel 13 and a controller 14. The protective layer 11, which is the uppermost layer of the projective capacitive touch apparatus 1, is made of a transparent material. The display device 12, which is the lowermost layer of the projective capacitive touch apparatus 1, is configured to project an image upwards. The projective capacitive touch panel 13 is disposed between the protective layer 11 and the display device 12 and is electrically connected to the controller 14.

In reference to FIG. 2, the projective capacitive touch panel 13 is formed with two sets of sensing electrodes-non-parallel to each other. The two sets of sensing electrodes are crossed with each other and correspond to different coordinate axes respectively. Each set of sensing electrodes has a plurality of sensing electrodes. For example, the projective capacitive touch panel 13 has a plurality of X-axis sensing electrodes 131 and a plurality of Y-axis sensing electrodes 132, in which an X-axis sensing electrode 131$x$ intersects a Y-axis sensing axis 132$y$ at the touched position 133.

Due to biological electrostatic charges, a variation in the induced capacitance and potential difference will occur at the touched position 133 on the projective capacitive touch panel 13 corresponding to the position being touched. This results in a potential variation and a very small induced current in the X-axis sensing electrode 131$x$ and the y-axis electrode 132$y$ crossing the touched position 133. Hence, by detecting such potential variation and/or an induced current, the projective capacitive touch panel 13 generates a set of reference signals and transmits it to the controller 14, which then generates a set of coordinate values according to the set of reference signals. According to this set of coordinate values, an application determines which function the user wants to execute.

FIG. 3 is a schematic view illustrating a case when the user touches two points on the projective capacitive touch apparatus 1 simultaneously. When the user touches two distinct positions on the protective layer 11 simultaneously, an induced capacitance will be generated at the first touched position 133$a$ and the second touched position 133$b$ of the projective capacitive touch panel 13 respectively. Then, a potential variation and induced current will occur in the first X-axis sensing electrode 131$a$ and the first Y-axis sensing electrode 132$a$ crossing the first touch position 133$a$ respectively, as is also the case when the second X-axis sensing electrode 131$b$ and second Y-axis sensing electrode 132$b$ crosses the second touch position 133$b$.

However, in this case, the potential variations and/or induced currents corresponding to the two X-axis coordinate axes and the two Y-axis coordinate axes respectively will be detected by the projective capacitive touch panel 13 simultaneously and in turn be identified as two X-coordinate values and two Y-coordinate values. These X-coordinate values and Y-coordinate values can be combined arbitrarily to represent four touched positions, namely, the first touched position 133a, the second touched position 133b, the third touched position 133c and the fourth touched position 133d. Among the four touched positions, the third touched position 133c and the fourth touched position 133d are known as ghost touched positions, i.e., they are not actual positions where the user touches. Accordingly, the controller 14 is unable to identify which of the four touched positions are the actual positions where the user touches according to these X coordinate values and Y coordinate values, i.e., the controller 14 is incapable of identifying the first touched position 133a and the second touched position 133b, which renders it impossible for the projective capacitive touch sensing device 1 to provide a multi-touch function.

In view of this, it is highly desirable in the art to provide a projective capacitive touch sensing apparatus capable of identifying distinctive touched positions and a method for identifying distinctive touched positions.

SUMMARY OF THE INVENTION

One objective of this invention is to provide a method for identifying distinctive positions. The distinctive positions are defined on a projective capacitive touch panel. The method comprises the following steps: (1) generating a first set of reference values according to the first touched position; (2) generating a plurality of second sets of reference values according to the second touched position, wherein the plurality of the second sets of reference values comprise a real second set of reference values and at least one ghost second set of reference values, while the ghost second set of reference values comprises parts of the first set of reference values; and (3) filtering out the ghost second set of reference values.

Another objective of this invention is to provide a projective capacitive touch apparatus. The projective capacitive touch apparatus comprises the following components: a projective capacitive touch panel adapted to generate a reference signal according to the touched position; a controller connected to the projective capacitive touch panel and adapted to generate a first set of reference values according to the first reference signal generated from a first touched position and to generate a plurality of second sets of reference values according to the second reference signal generated from the second touched position, wherein the plurality of the second sets of reference values comprise a real second set of reference values and at least one ghost second set of reference values, while the ghost second set of reference values comprises parts of the first set of reference values; and a processor for filtering out the ghost second set of reference values.

Yet a further objective of this invention is to provide a projective capacitive touch apparatus. The projective capacitive touch apparatus comprises the following components: a generating means for generating a first set of reference values according to the first touched position and a plurality of second sets of reference values according to the second touched position, wherein the plurality of second sets of reference values comprise a real second set of reference values and at least one ghost second set of reference values, while the ghost second set of reference values comprise parts of the first set of reference values; and a filtering means for filtering out the ghost second set of reference values.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
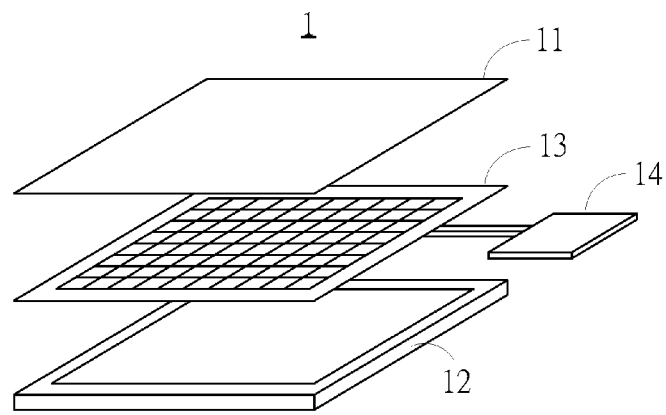
FIG. 1 is a schematic view of a conventional projective capacitive touch sensing device.
Figure 2:
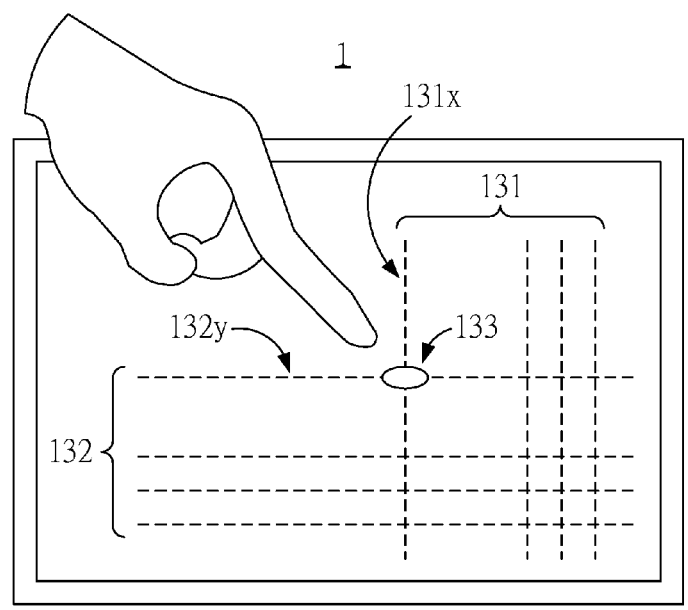
FIG. 2 is a schematic view illustrating a single-touch case in the conventional projective capacitive touch sensing device.
Figure 3:
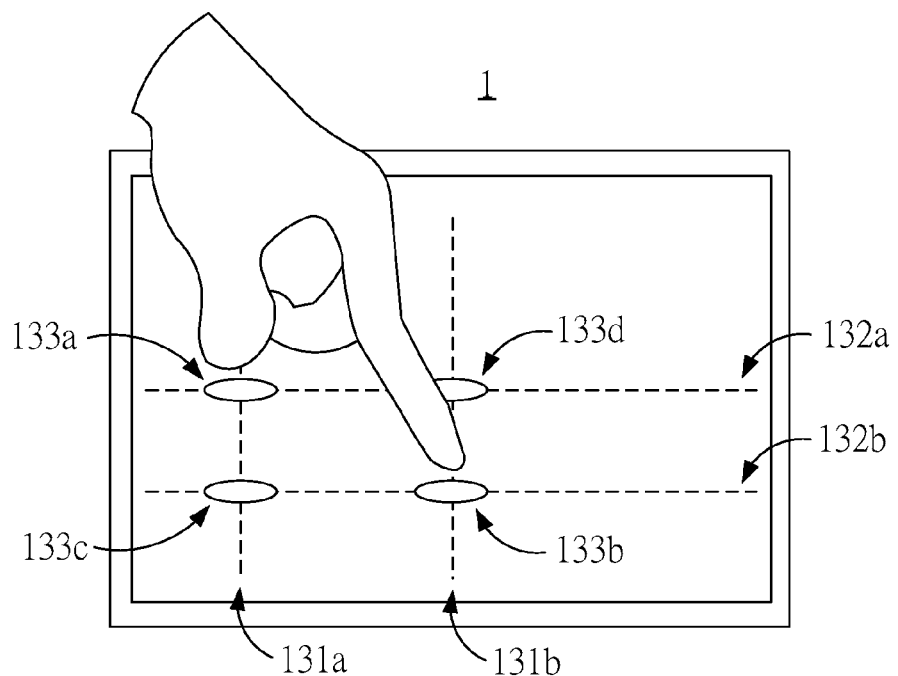
FIG. 3 is a schematic view illustrating a multi-touch case in the conventional projective capacitive touch sensing device.
Figure 4:
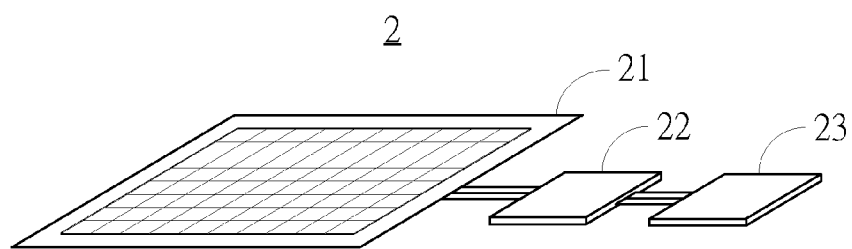
FIG. 4 is a schematic view of a projective capacitive touch apparatus of this invention.

FIG. 4 is a schematic view illustrating the structure of a projective capacitive touch apparatus 2 of this invention. The projective capacitive touch apparatus 2 comprises a projective capacitive touch panel 21, a controller 22 and a processor 23. The projective capacitive touch panel 21 is adapted to sense touch from a user and generate a reference signal according to the touched position. The controller 22 is connected to the projective capacitive touch panel 21 and the processor 23 respectively, and is adapted to generate at least one reference value according to the reference signal generated by the projective capacitive touch panel 21. The processor 23 is adapted to receive and filter the reference value.

Figure 5:
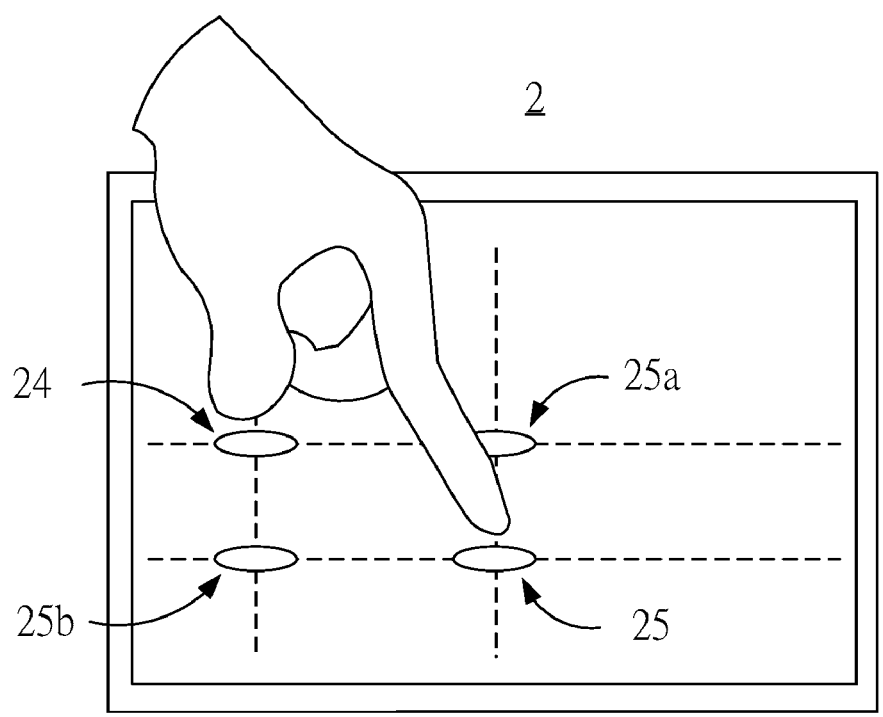
FIG. 5 is a schematic view illustrating the operations of the projective capacitive touch apparatus of this invention.

FIG. 5 is a schematic view illustrating a multi-touch operation. When the user touches a first touched position 24 and a second touched position 25 distinct from the first touched position 24 on the projective capacitive touch apparatus 2 simultaneously, a time difference usually exists between the moments when the two touched positions are touched, i.e., the finger of the user touches the first touched position 24 first before another finger touches the second touched position 25. To identify distinctive touched positions, the projective capacitive touch apparatus 2 of this invention has a scanning cycle, and by reducing the scanning cycle so that the cycle is smaller than the time difference between two touches, the different touches will fall within different scanning cycles. In this way, the projective capacitive touch apparatus 2 will be able to identify the touch sequence of the distinctive touched positions. That is, the controller 22 determines the first touched position 24 in a first scanning cycle, and determines the second touched position 25 in a second scanning cycle. In application, the scanning cycle is preferably smaller than 0.0125 second, i.e., the scanning frequency is preferably higher than 80 Hz, so that the projective capacitive touch apparatus 2 can effectively identify the time sequence in which distinctive touched positions are touched.

When the first touched position 24 is touched in a first scanning cycle, the projective capacitive touch panel 21 generates a first reference signal according to the first touched position 24 and transmits the first reference signal to the controller 22. After having determined the first reference signal of the first touched position 24 in the first scanning cycle, the controller 22 generates a first set of reference values according to the first reference signal generated from the first touched position. The first set of reference values may be a first set of coordinate values, which may be one of a set of two-dimensional coordinate values, a set of three-dimensional coordinate values and coordinate values of another number of dimensions. In this embodiment, the first set of reference values is a first set of two-dimensional coordinate values.

Next, when the second touched position 25 is touched in a second scanning cycle, the projective capacitive touch panel 21 generates a second reference signal of the second touched position 25 and transmits it to the controller 22. The controller 22 then generates a plurality of second sets of reference values according to the second reference signal. Similarly, the plurality of second sets of reference values may be a plurality of second sets of coordinate values, each of which may be one of a set of two-dimensional coordinate values, a set of three-dimensional coordinate values and coordinate values of another number of dimensions. In this embodiment, the plurality of second sets of reference values is a plurality of second sets of two-dimensional coordinate values.

By analyzing the first set of reference values and the plurality of second sets of reference values, it can tell that there are a first set of reference values corresponding to the first touched position 24, a real second set of reference values corresponding to the second touched position 25, and at least one ghost second set of reference values. The ghost second set of reference values comprises parts of the first set of reference values and corresponds to the ghost touched position.

In reference to FIG. 5, the second set of reference values of this embodiment comprises two ghost second sets of reference values corresponding to a first ghost touched position 25a and the second ghost touched position 25b respectively. In more detail, the two ghost second sets of reference values are two ghost second sets of two-dimensional coordinate values, each of which comprises parts of the first set of two-dimensional coordinate values.

Upon receiving the second sets of reference values generated by the controller 22, the processor 23 determines and filters the ghost second sets of reference values out of the plurality of second sets of reference values according to the coordinate values of the first set of reference values, thereby obtaining the real second set of reference values.

However, if the user performs a single-touch action with an excessively large touched area, it is possible that the projective capacitive touch panel 21 would determine it as multiple touched positions and generate a second set of reference signals. Consequently, the controller 22 would generate a plurality of second sets of reference values. To avoid such a case, the processor 23 compares the real second set of reference values with the first set of reference value, and only when the difference between the first set of reference values and the second set of reference values is determined to be larger than the threshold value, will the processor 23 determine that it is a multi-touch action instead of an improper single-touch action.

Figure 6:
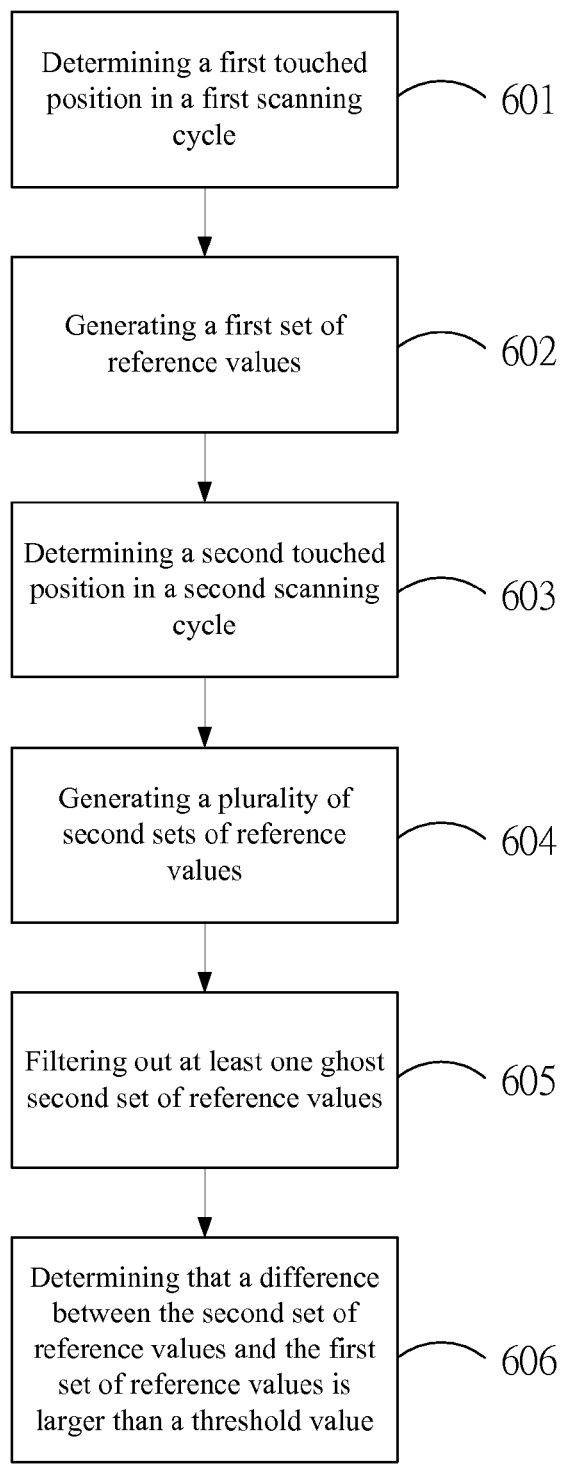
FIG. 6 is a flowchart of a method for identifying the distinctive touched positions of this invention.

FIG. 6 depicts a flowchart of a method for identifying distinctive touched positions according to another embodiment of this invention. This embodiment is applicable to the projective capacitive touch apparatus described above. Hereinafter, this method will be described with the projective capacitive touch apparatus 2 as an example. In Step 601, the controller 22 determines the first touched position 24 in the first scanning cycle. In Step 602, the controller 22 generates the first set of reference values according to the first reference signal generated from the first touched position 24. In Step 603, the controller 22 determines the second touched position 25 in a second scanning cycle. In Step 604, the controller 22 generates a plurality of second sets of reference values according to the second reference signal generated from the second touched position 25. In Step 605, according to the coordinate values of the first set of reference values, the processor 23 determines and filters out at least one ghost second set of reference values among the plurality of second sets of reference values to obtain a real second set of reference values. Next, in Step 606, the processor 23 compares the first set of reference values with the real second set of reference values, and only when a difference between the first set of reference values and the second set of reference values is determined to be larger than a threshold value, will the processor 23 determine that it is a multi-touch action instead of an improper single-touch action.

With the projective capacitive touch apparatus and the method for identifying distinctive touched positions described above, the distinctive touched positions on the touch apparatus can be identified. As a further application, an operational gesture on the touch apparatus can also be identified in this way. More specifically, when the user's fingers perform a multi-touch action on the touch apparatus and move around on the touch apparatus, the projective capacitive touch panel 21 may generate a first continuous reference signal according to the first motion trajectory generated by movement of the first touched position, and the controller 22 may generate a first set of continuous reference value sequence according to the first continuous reference signal. Similarly, the projective capacitive touch panel 21 may generate a second continuous reference signal according to a second motion trajectory generated by movement of the second touched position, and the controller 22 may generate a second set of continuous reference value sequence according to the second continuous reference signal. The processor 23 then executes the corresponding functions according to the first set of continuous reference value sequence and the second set of continuous reference value sequence, for example, to zoom in a portion of a picture, close a current picture, and so on.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A method for identifying distinctive positions, the distinctive positions being defined on a projective capacitive touch panel of a projective capacitive touch apparatus, the method being executed by the prolective capacitive touch apparatus, the method comprising the steps of:
   (1) generating a first set of reference values according to a first touched position;
   (2) generating a plurality of second sets of reference values according to a second touched position, wherein:
      the plurality of the second sets of reference values comprise a real second set of reference values and at least one ghost second set of reference values; and
      the at least one ghost second set of reference values comprises parts of the first set of reference values; and
   (3) filtering out the at least one ghost second set of reference values.

2. The method as claimed in claim 1, wherein the step (1) is to generate a first set of coordinate values according to the first touched position, and the step (2) is to generate a plurality of second sets of coordinate values according to the second touched position.

3. The method as claimed in claim 2, wherein:
   the step (1) is to generate a first set of two-dimensional coordinate values according to the first touched position;
   the step (2) is to generate three second sets of two-dimensional coordinate values according to the second touched position;

the three second sets of two-dimensional coordinate values comprise a real second set of two-dimensional coordinate values and two ghost second sets of two-dimensional coordinate values; and each of the ghost second sets of two-dimensional coordinate values comprises one different one-dimensional coordinate value of the first set of two-dimensional coordinate values.

4. The method as claimed in claim 1, after the step (2), further comprising the step of determining that the difference between the real second set of reference values and the first set of reference values is greater than a threshold value.

5. The method as claimed in claim 1, wherein the step (1) comprises the step of determining the first touched position in a first scanning cycle.

6. The method as claimed in claim 5, wherein the step (2) comprises the step of determining the second touched position in a second scanning cycle.

7. The method as claimed in claim 1, further comprising the step of generating a first set of continuous reference value sequence according to a first motion trajectory generated by movement of the first touched position.

8. The method as claimed in claim 1, further comprising the step of generating a second set of continuous reference value sequence according to a second motion trajectory generated by movement of the second touched position.

9. A projective capacitive touch apparatus, comprising:
a projective capacitive touch panel, being adapted to generate a reference signal according to a touched position;
a controller, being connected to the projective capacitive touch panel and adapted to generate a first set of reference values according to a first reference signal generated from a first touched position and to generate a plurality of second sets of reference values according to a second reference signal generated from a second touched position, wherein:
the plurality of the second sets of reference values comprise a real second set of reference values and at least one ghost second set of reference values; and
the at least one ghost second set of reference values comprises parts of the first set of reference values; and
a processor for filtering out the at least one ghost second set of reference values.

10. The projective capacitive touch apparatus as claimed in claim 9, wherein the controller is configured to generate a first set of coordinate values and a plurality of second sets of coordinate values according to the first touched position and the second touched position respectively.

11. The projective capacitive touch apparatus as claimed in claim 10, wherein:
the controller is configured to generate a first set of two-dimensional coordinate values and three second sets of two-dimensional coordinate values according to the first touched position and the second touched position respectively;
the three second sets of two-dimensional coordinate values comprise a real second set of two-dimensional coordinate values and two ghost second sets of two-dimensional coordinate values; and
each of the ghost second sets of two-dimensional coordinate values comprises one different one-dimensional coordinate value of the first set of two-dimensional coordinate values.

12. The projective capacitive touch apparatus as claimed in claim 9, wherein the processor is further configured to determine that the difference between the real second set of reference values and the first set of reference values is greater than a threshold value.

13. The projective capacitive touch apparatus as claimed in claim 9, wherein the controller is configured to determine the first touched position in a first scanning cycle.

14. The projective capacitive touch apparatus as claimed in claim 9, wherein the controller is configured to determine the second touched position in a second scanning cycle.

15. The projective capacitive touch apparatus as claimed in claim 9, wherein the controller further generates a first set of continuous reference value sequence according to a first motion trajectory generated by movement of the first touched position.

16. The projective capacitive touch apparatus as claimed in claim 9, wherein the controller further generates a second set of continuous reference value sequence according to a second motion trajectory generated by movement of the second touched position.

17. The projective capacitive touch apparatus as claimed in claim 13, wherein the first scanning cycle is smaller than 0.0125 second.

18. The projective capacitive touch apparatus as claimed in claim 14, wherein the second scanning cycle is smaller than 0.0125 second.

19. A projective capacitive touch apparatus, comprising:
a generating means for generating a first set of reference values according to a first touched position and a plurality of second sets of reference values according to a second touched position, wherein:
the plurality of second sets of reference values comprise a real second set of reference values and at least one ghost second set of reference values; and
the at least one ghost second set of reference values comprise parts of the first set of reference values; and
a filtering means for filtering out the at least one ghost second set of reference values.

20. The projective capacitive touch apparatus as claimed in claim 19, wherein the generating means is to generate a first set of coordinate values and a plurality of second sets of coordinate values according to the first touched position and the second touched position respectively.

21. The projective capacitive touch apparatus as claimed in claim 20, wherein:
the generating means is to generate a first set of two-dimensional coordinate values and three second sets of two-dimensional coordinate values according to the first touched position and the second touched position respectively;
the three second sets of two-dimensional coordinate values comprise a real second set of two-dimensional coordinate values and two ghost second sets of two-dimensional coordinate values; and
each of the ghost second sets of two-dimensional coordinate values comprises one different one-dimensional coordinate value of the first set of two-dimensional coordinate values.

22. The projective capacitive touch apparatus as claimed in claim 19, wherein the generating means is further configured to determine that the difference between the real second set of reference values and the first set of reference values is greater than a threshold value.

23. The projective capacitive touch apparatus as claimed in claim 19, wherein the generating means is configured to determine the first touched position in a first scanning cycle.

24. The projective capacitive touch apparatus as claimed in claim 23, wherein the generating means is configured to determine the second touched position in a second scanning cycle.

25. The projective capacitive touch apparatus as claimed in claim 19, wherein the generating means is to further generate a first set of continuous reference value sequence according to a first motion trajectory generated by movement of the first touched position.

26. The projective capacitive touch apparatus as claimed in claim 19, wherein the generating means is to further generate a second set of continuous reference value sequence according to a second motion trajectory generated by movement of the second touched position.

27. The projective capacitive touch apparatus as claimed in claim 23, wherein the first scanning cycle is smaller than 0.0125 second.

28. The projective capacitive touch apparatus as claimed in claim 24, wherein the second scanning cycle is smaller than 0.0125 second.

* * * * *